United States Patent [19]

Rosier

[11] Patent Number: 4,686,541
[45] Date of Patent: Aug. 11, 1987

[54] HIGH RESOLUTION IMAGE RESTITUTION APPARATUS FOR A PLANE FILM SUPPLIED FROM A COIL AND CUT INTO FILM-PORTIONS

[75] Inventor: Jean-Claude Rosier, Gasny, France

[73] Assignee: Societe Europeenne De Propulsion, Puteaux, France

[21] Appl. No.: 778,142

[22] Filed: Sep. 20, 1985

[30] Foreign Application Priority Data

Sep. 28, 1984 [FR] France .................. 84 15007

[51] Int. Cl.[4] .................. G01D 9/00; G01D 9/42; G03G 15/00; G03B 29/00
[52] U.S. Cl. .................. 346/108; 355/13; 355/29; 346/24
[58] Field of Search .................. 346/108, 107 R, 160, 346/136, 24; 355/13, 29

[56] References Cited

U.S. PATENT DOCUMENTS 3,585,289  6/1971  Huber .................. 346/24
3,781,902  12/1973  Shim et al. .................. 346/24
3,874,621  4/1975  Blair .................. 346/108
4,165,512  8/1979  Peterson .................. 346/24

FOREIGN PATENT DOCUMENTS 174660  11/1965  U.S.S.R. .

OTHER PUBLICATIONS

Patent abstracts of Japan, vol. 7, No. 13(E-153), [1158], 19 Janvier 1983; and JP-A-57 171 878, (Olympus Kogaku Kogyo K. K.), 22-10-1982.

Primary Examiner—E. A. Goldberg
Assistant Examiner—Mark Reinhart
Attorney, Agent, or Firm—Brumbaugh, Graves, Donohue & Raymond

[57] ABSTRACT

This invention relates to an apparatus for the restitution of high-resolution images comprising a film-holder adapted to receive a flat film coated with a photosensitive material, a light source producing a light beam, a modulator on the path of the light beam and a device for scanning said film in successive lines by means of said beam, wherein it comprises removable means adapted to receive a reel delivering continuously wound film, means for driving the film out of the reel along a film supply plane, means for applying a portion of film on the film-holder, means for transversely cutting the film, means for driving the film from the film-holder along and evacuation plane, removable means for receiving the portions of exposed, cut out film evacuated from the film-holder. A high resolution image apparatus for web film in which the web is cut into planar portions for scanning. The web of film is cut into planar portions them scanned with a modulated beam. The exposed film is advanced and removed from the system.

18 Claims, 4 Drawing Figures

HIGH RESOLUTION IMAGE RESTITUTION APPARATUS FOR A PLANE FILM SUPPLIED FROM A COIL AND CUT INTO FILM-PORTIONS

The present invention relates to an apparatus for the restitution of high-resolution images.

This type of apparatus is particularly encountered in earth stations where the information received from exploration and survey satellites is processed.

Taking into account their degree of sophistication, it will be readily appreciated that they are particularly expensive apparatus and that, as a counterpart to this, it is desired to increase their production capacity In order to situate the difficulties encountered, it will be mentioned that the images obtained have a dimension of the order of 250 mm×250 mm and each comprise 20,000×20,000 image points.

Such images are typically obtained by scanning a photosensitive film by means of a light beam modulated in intensity, scanning being effected line by line. The film is disposed on a support with high precision so that the spot of the beam on the film is perfectly constant during scanning.

In a first generation of known apparatus, the support consists of a cylindrical drum against which the film is applied on the outside and scanning is ensured by the rotation of the drum about its axis, combined with the translation of the optical system for returning the beam.

Such apparatus necessitate the frequent intervention of an operator, particularly for installing the film on the drum and this operation is rendered difficult by the fact that it must be carried out in the dark.

In a second generation of known apparatus, the film is packed in a reel and unwound by increments corresponding to the length of an image, then wound on a receiver reel after exposure. In that case, the support is fixed and presents a semi-cylindrical concave surface against which the film is applied during the exposure time of an image.

The images can be developed only when the reel has totally delivered. This presents various drawbacks:

Firstly, a relatively long time lapses between exposure and development of the film, this resulting in a degradation of the latent images. An aggravating circumstance is that, as the images are developed in an order opposite their exposure, the first images exposed will therefore be the most degraded.

Secondly, no control can be made before the first image has been developed. If, further to an error, the parameters of exposure and/or framing of the images are defective, a large number of images must be discarded, and the corresponding operational time of the restitution apparatus is wasted.

It may, of course, be imagined to couple an apparatus of this type directly with a developer, but it is quickly observed that such a solution would be unrealistic insofar as a perfect synchronism must be ensured between the two apparatus. Moreover, such a solution would amount to under-using the developer, since the usual capacity thereof is largely greater (at least 2 to 3 times) than that of the restitution apparatus. Finally, the developer employs chemical compounds which are preferably kept apart from the reel of blank film at the entrance of the restitution apparatus.

With a view to overcoming these various drawbacks, the present invention proposes an apparatus for the restitution of high-resolution images comprising a film-holder adapted to receive a flat film coated with a photosensitive material, a light source producing a light beam, a modulator on the path of the light beam and a device for scanning said film in successive lines by means of said beam, wherein it comprises removable means adapted to receive a reel delivering continuously wound film, means for driving the film out of the reel along a film supply plane, means for applying a portion of film on the film-holder, means for transversely cutting the film, means for driving the film from the film-holder along an evacuation plane, removable means for receiving the portions of exposed, cut out film evacuated from the film-holder.

The invention will be more readily understood on reading the following description with reference to the accompanying drawings, in which.

Figure 1:
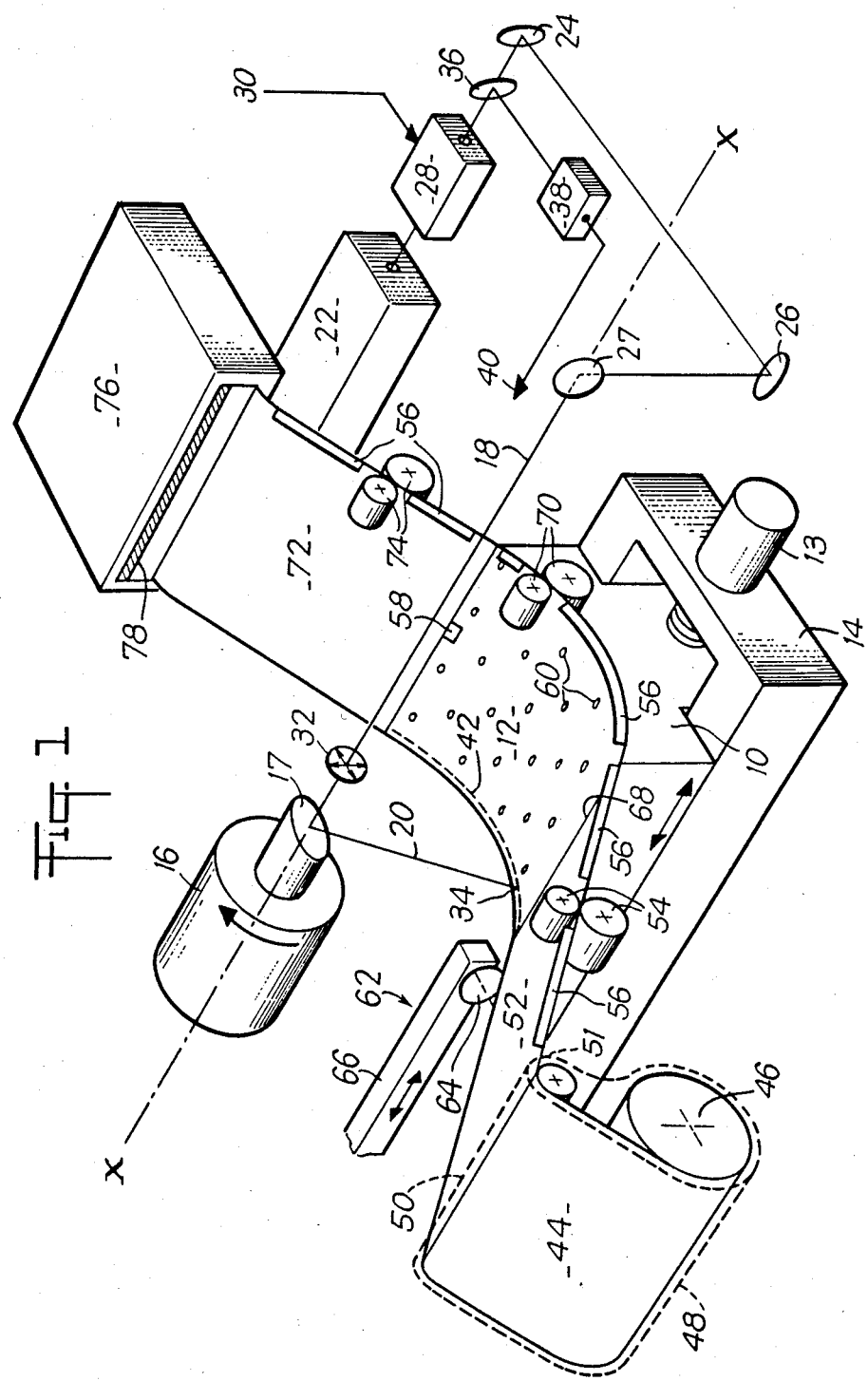
FIG. 1 is a perspective diagram of an image restitution apparatus according to the invention.

Referring now to the drawings, and as indicated in the diagram of FIG. 1, the central part of the restitution apparatus comprises a film-holder cradle 10 presenting a semi-cylindrical concave surface 12 adapted to receive sections of photosensitive film, as will be seen hereinafter.

The cradle 10 is mounted to slide linearly, under the control of a step-by-step motor 13 on a guide 14, the direction of slide being parallel to the axis XX of the surface 12.

A rotating system 16 incorporating an oblique mirror 17, mounted to rotate about axis XX, returns a light beam 18 directed along axis XX in the form of a scanning beam 20 directed perpendicularly to the surface of the cradle.

In manner known per se, the beam 18 is produced by a light source 22, for example a laser, and it is conducted along axis XX with the aid of mirrors 24, 26, 27. The beam passes through a modulator 28 which modulates the intensity of the beam as a function of image data conducted via a control input 30. It also passes through an optical focussing system 32, so as to produce a spot 34 of predetermined diameter on the film. A semi-transparent mirror 36 takes a part of the beam downstream of the modulator 28 and returns it towards a measuring cell 38 of which the output signal 40 is used in a servo-control circuit.

The rotating system 16 rotates permanently at regular speed about axis XX, with the result that, upon each rotation, and through an angle of about 90°, the spot describes a line 42 on the film applied on the cradle. During the rest of the rotation where the beam is not directed towards the film, the cradle 10 is displaced by an incremental distance corresponding to the desired spacing between lines. The following line is scanned when the beam is again directed towards the film.

The whole of the apparatus is, of course, mounted on a principal chassis and enclosed in a light-proof cover, which have not been shown in order to render the drawings clearer.

Supply of film and evacuation thereof are ensured in the following manner:

The film 44 is wound on a mandrel 46, the photosensitive emulsion being oriented towards the outside, and the roll thus constituted is stored in a removable, light-proof cassette 48, the film leader emerging from the cassette between two protecting lips 50, 51.

This cassette may consequently be suitably loaded in the dark room, then transported in ambient light to the apparatus in which it is mounted on the chassis.

The film leader is guided over an inclined supply plane 52 so as to be approximately tangential to one of the edges of the concave surface 12 of the film-holder cradle.

Advance of the film over the supply plane is ensured by means of a pair of motorized supply rollers 54 which grip the edge of the film, guiding of the latter being ensured by a lateral strip 56 against which the film is constantly in abutment, for example thanks to a slightly oblique orientation of the supply rollers.

The film leader reaches the cradle and slides over its concave surface until it encounters a detector 58 placed at the other end of the cradle. When the detector is triggered off, the motor of the supply rollers 54 is stopped.

The portion of film covering the cradle is then perfectly applied by suction on its concave surface. To this end, the cradle comprises a plurality of small-sized holes 60 regularly spaced along the concave surface and which are connected to a suction device (not shown).

The restitution apparatus also comprises means for cutting the film, in the form of a guillotine cutter 62 which, in the embodiment illustrated, consists of a cutter with roller, of which the roller 64 is borne by a bracket 66 mobile parallel to the axis XX and cooperates with an edge 68 placed along the downstream edge of the supply plane, i.e. the edge opposite the cradle.

It will be noted that the cradle also bears a pair of transfer rollers 70 whose role will be explained hereinafter. During the film supply phase described hereinabove, these rollers are maintained spaced apart from each other so as not to disturb the advance of the film.

Once the film is applied on the cradle and cut with the aid of the cutter, the film printing phase begins, as described hereinbefore.

When printing is terminated, the film-holder cradle automatically returns to its starting position. The transfer rollers 70 are brought towards each other, then set in operation in order to drive the sheet of film out of the cradle and along an ejection plane 72, similar to the supply plane described hereinabove and likewise oriented substantially along the tangent to the opposite edge of the cradle.

On the ejection plane, the sheet of film is taken up by a pair of ejection rollers 74 which push it inside a removable, light-proof receiver cassette 76.

The receiver cassette is also fixed on the chassis and against the cover of the apparatus and bears a shutter 78 which is automatically open when the cassette is mounted on the apparatus and closed when it is withdrawn. Similarly, the hood bears a shutter (not shown) which closes automatically when the cassette is withdrawn.

Thanks to these arrangements, it is possible to extract the receiver cassette as soon as the first image of a series has been exposed and to proceed immediately with its development, with the double advantage of avoiding degradation of the latent image and of allowing virtually real time control.

Such control is in fact indispensable when it is realized that the control of the apparatus and the sequencing of the image data are under the dependence of data processing systems which enable the various parameters of restitution (framing, definition, scale of contrasts, choice of scenes, etc...) to be varied and that one error in programmation (for example an off-centered frame) would suffice to discard a whole series of images.

Here, the high-speed development of the exposed images or of a choice of images (the first and/or the second, or any image of a predetermined row) reveals any errors in a very short time, which may be corrected immediately before continuing the restitution of a series of images.

Of course, whilst the or each operator is making various adjustments for the restitution of a new series of images, the apparatus may continue to operate and expose series of images for which adjustments have already been made.

If necessary, it is possible to interpose between two images of a series being exposed a test image of a series for which the parameters are being adjusted, which test image may be developed separately, independently of the preceding and following images.

The presentation of the exposed images, sheet after sheet, collected in the film receiving cassette, makes it possible, at any moment, to develop the or each image contained in the cassette.

It is also possible to couple the restitution apparatus directly to a device for automatically developing the film, by means of a transfer belt interposed between the film ejection plane and this automatic developer.

In fact, such coupling is rendered possible only thanks to the production of images by the restitution apparatus in flat films. The two apparatus (restitution apparatus and automatic developer) may thus operate in totally asynchronous mode. Moreover, the fact of one of the two apparatus stopping does not disturb the operation of the other.

This arrangement also makes it possible very easily to modify the priorities of development by manually reversing one or more images in the supply magazine.

From this basic embodiment, the invention may have numerous variants made thereto. The following variants will be mentioned by way of non-limiting example:

A plurality of delivery cassettes and a plurality of receiver cassettes will be provided so as to shorten the stoppage times of the machine to a maximum.

Figure 2:
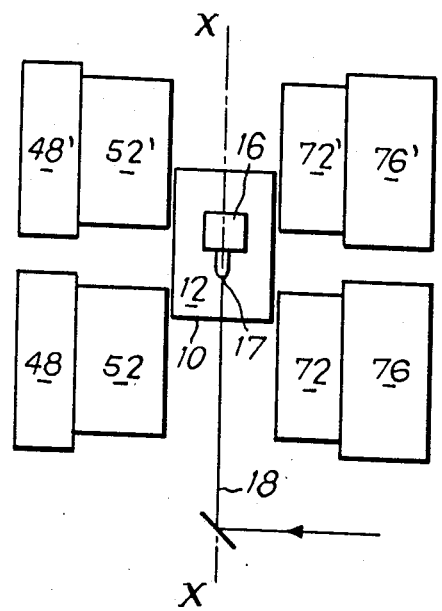
FIG. 2 is a schematic plan view of a first variant embodiment of a restitution apparatus according to the invention.

To avoid the loss of time represented by the return of the film-holder cradle to its starting position for evacuation of the exposed film and positioning of a new section of blank film, a second chain composed of delivery cassette 48'-supply plane 52'-evacuation plane 72'-receiver cassette 76' may be provided, according to FIG. 2, parallel to the first (48, 52, 72, 76) and in register with the position attained by the film-holder cradle 10 at the end of exposure of tne image. The cradle will therefore remain in this position during evacuation of the exposed image via the evacuation plane 72' of the second chain and the loading of a new section of film from cassette 48'. This second film is then exposed during the return stroke of the cradle. In that case, the apparatus may comprise a cutter common to the two chains or a cutter for each chain, as desired.

Figure 3:
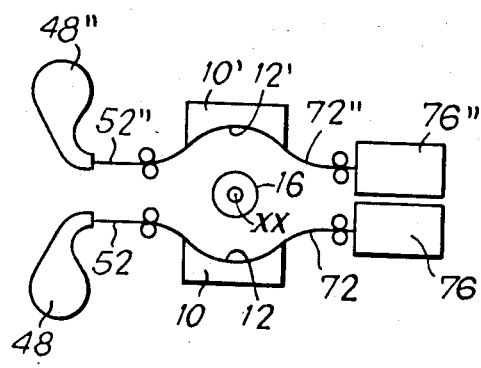
FIG. 3 is a schematic side view of a second variant embodiment of the restitution apparatus according to the invention.

To make best use of the time during which the rotating system 16 with inclined mirror sweeps the 270° between the end of scanning of one line and the beginning of the following line, a second cradle 10' may be provided (cf. FIG. 3) diametrically opposite the first 10 and which may be served either by the same "delivery cassette-supply plane-evacuation plane-receiver cassette" chain as the first cradle, with the addition of appropriate switches upstream and downstream, or by a distinct chain 48", 52", 72", 76", superposed on the first.

The preceding two variants may also be combined in an apparatus with two diametrically opposite cradles and two (or four) parallel (or parallel and superposed) chains for circulation of the film.

Figure 4:
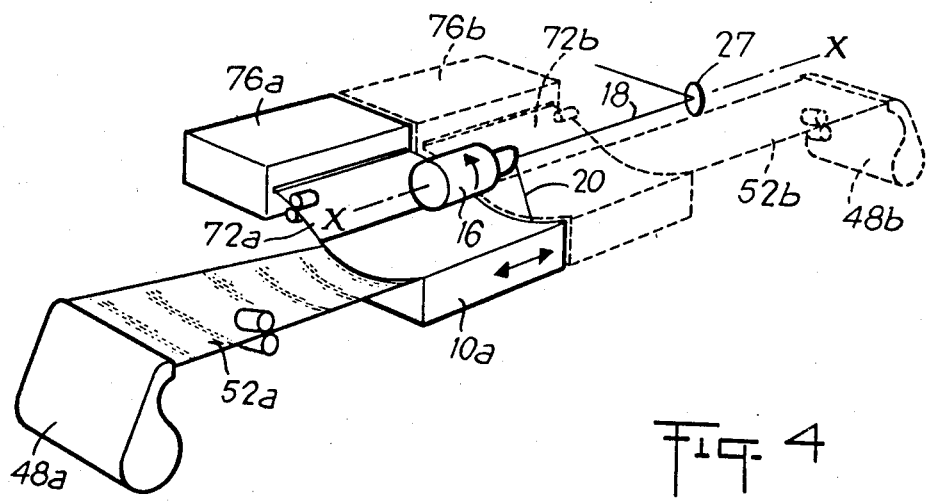
FIG. 4 is a schematic view in perspective of a third variant embodiment of the restitution apparatus according to the invention.

Finally, the cradle may be disposed parallel to the direction of supply of the film (FIG. 4). In that case, the supply plane 52a will have a surface progressively in the form of a gutter so as progressively to give the film a semi-cylindrical profile during its introduction on the cradle 10a. The film 72a may be evacuated either parallel to the direction of supply at the end of the forward stroke, or at the end of the return stroke of the carriage, or perpendicularly in the same manner as described hereinabove (as illustrated in the Figure). Here again, two delivery cassettes 48a, 48b and two supply planes 52a, 52b disposed in opposition at the two ends of the apparatus, as well as two diametrically opposite carriages, may be provided.

The apparatus which has been described is essentially intended for making black and white images, but it goes without saying that it may also be an apparatus for making images in colour. In that case, the light beam will be constituted by the superposition of three beams of wave-lengths representative of three primary colours, these three beams being modulated separately then superposed with the aid of mirrors and semi-reflecting blades.

An apparatus might also be imagined in which the cradle is fixed and the rotating system is mounted in translation along axis XX. However, by reason of the sudden accelerations/decelerations during the incremental displacements along axis XX, vibrations would occur in the rotating system and therefore in the rotating mirror, which would be detrimental to the sharpness of the image obtained. In addition, it would be difficult to make the apparatus so as constantly to ensure perfect coincidence of the axis of rotation of the rotating system and of the geometrical axis of the cradle during the whole translation of the rotating system.

For these reasons, an embodiment will be preferred in which the rotating system is fixed and the cradle is mobile in translation.

What is claimed is:

1. An apparatus for the restitution of high-resolution images comprising a film-holder adpated to receive a flat film coated with a photosensitive material, a light source producing a light beam, a modulator on the path of the light beam and a device for scanning said film in successive lines by means of said beam, and
    further comprising removable means adapted to receive a reel delivering continuously wound film, first means for driving the film out of the reel along a film supply plane, means for applying a portion of film on the film-holder, means for transversely cutting the film after the film is applied to the film holder and prior to exposure of the film, second means for driving the film after exposure from the film-holder along an evacuation plane, and removable means for receiving the portions of exposed, cut out film evacuated from the film-holder.

2. The apparatus of claim 1, wherein said film-holder consists of a cradle provided with a concave, semi-cylindrical surface for receiving the film, presenting an axis (XX), said cradle being mounted to move in translation parallel to said axis.

3. The apparatus of claim 2, wherein said transverse cutting means consist of a guillotine cutter located at the end of the supply plane adjacent the cradle.

4. the apparatus of claim 2, wherein said transverse cutting means comprises a roller borne by a bracket mobile transversely to the supply plane and an edge placed at the end of the supply plane adjacent said cradle.

5. The apparatus as defined in claim 2, wherein said film drive means each consist of a pair of motorized rollers mounted respectively on the edge of the supply plane, the cradle and of the evacuation plane.

6. the apparatus as defined in claim 2, wherein said cradle comprises a plurality of holes opening along said semi-cylindrical surface and connected to a suction device.

7. The apparatus as defined in claim 2, wherein it comprises means adapted to bring said beam into coincidence with the axis (XX) of the semi-cylindrical surface of the cradle, and a rotating system incorporating an inclined mirror, driven in rotation about said axis (XX) and reflecting said beam perpendicularly to the semi-cylindrical surface.

8. the apparatus as defined in claim 2, wherein the axis of the semi-cylindrical surface of the cradle is disposed transversely to the direction of advance of the film over the supply plane.

9. The apparatus as defined in claim 2, wherein the axis of the semi-cylindrical surface of the cradle is disposed substantially parallel to the direction of advance of the film over the supply plane.

10. The apparatus as defined in claim 2, wherein the axis of the semi-cylindrical surface of the cradle is disposed transversely to the direction of advance of the film over the evacuation plane.

11. The apparatus as defined in claim 2, wherein the axis of the semi-cylindrical surface of the cradle is disposed parallel to the direction of advance of the film over the evacuation plane.

12. The apparatus as defined in claim 2, wherein it comprises a second cradle of construction identical to the first and disposed symmetrically to the first cradle with respect to axis (XX).

13. The apparatus as defined in claim 2, wherein it comprises two supply planes and two evacuation planes disposed in parallel.

14. The apparatus of claim 12, wherein it comprises two supply planes and two evacuation planes disposed in superposition.

15. The apparatus as defined in claim 1, wherein the removable means adapted to receive a film delivery reel consist in a cassette having a box between which passes the leader of the film from inside the box to outside.

16. The apparatus as defined in claim 1, wherein the removable means adapted to receive the portions of exposed and cut out film consist in a receiver cassette having a light-proof box and provided with a shutter lying in register with the evacuation plane.

17. The apparatus as defined in claim 1, wherein said supply plane and said evacuation plane are provided with strips for guiding the film along at least one of their margins.

18. The apparatus as defined in claim 1, wherein it is associated with an image developer by means of a transfer belt interposed between the evacuation plane and said developer.

* * * * *